United States Patent [19]
Ansell

[11] Patent Number: 4,626,308

[45] Date of Patent: Dec. 2, 1986

[54] METHOD OF MAKING WELDED PIPE JOINTS

[75] Inventor: Donald J. Ansell, Wymond Ham, England

[73] Assignee: The Victaulic Company PLC, Hertfordshire, England

[21] Appl. No.: 578,690

[22] Filed: Feb. 9, 1984

[51] Int. Cl.⁴ .............................................. B32B 31/18
[52] U.S. Cl. .................................... 156/257; 156/268; 156/293; 219/535; 219/544; 285/21
[58] Field of Search .................... 285/21, 22; 156/138, 156/140, 143, 144, 257, 268, 293; 219/535, 544

[56] References Cited

U.S. PATENT DOCUMENTS 4,147,926  4/1979  Stähli ................................. 219/535
4,455,482  6/1984  Grandclement .................... 219/535

FOREIGN PATENT DOCUMENTS 2311279  3/1973  Fed. Rep. of Germany .
825165   2/1938  France ................................. 156/257
8200699  3/1982  PCT Int'l Appl. .

Primary Examiner—Caleb Weston
Attorney, Agent, or Firm—Kinney & Lange

[57] ABSTRACT

The invention provides a method of forming a welded joint between an end of a thermoplastic pipe or pipe like member and a surrounding pipe fitting including a thermoplastic sleeve, comprising the steps of forming around the internal wall of the sleeve a helical cut, said cut being inclined to the surface of the wall along the line of the cut, and the cutting tool and its angular relationship to the bore of the fitting being chosen such that during incision an internally extending flap of the thermoplastic material produced by the incision is caused to open out and deform transverse to the direction of incision whereby a helical cavity is formed within the sleeve wall; feeding into said cavity an electrically conducting wire; working the internal wall of the sleeve so as to lay, at least partially, the flap against that wall and enclose the wire within the cavity between the flap and the sleeve wall; fitting the sleeve about the end of the pipe or pipe like member; and passing an electrical current through the electrical wire so as to fuse the sleeve to the pipe or pipe like member.

8 Claims, 6 Drawing Figures

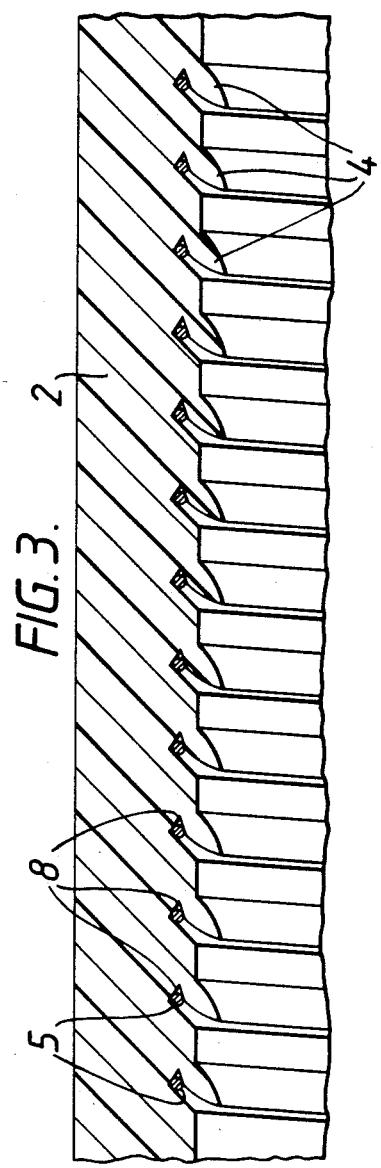
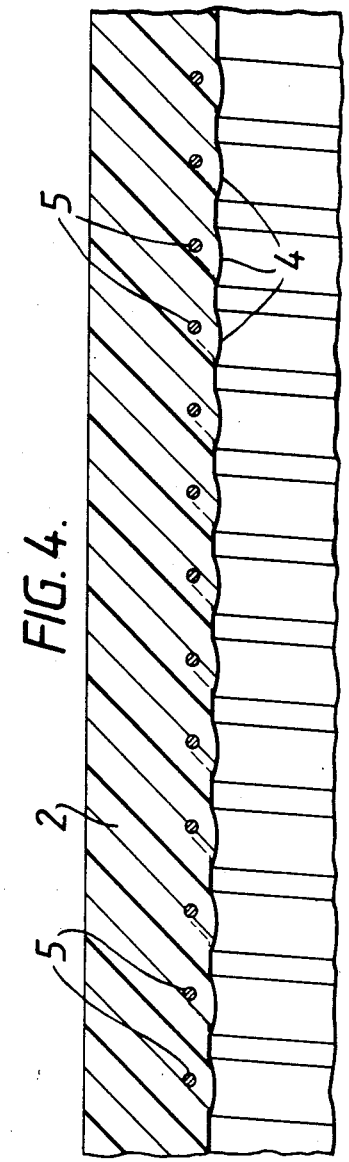
FIG. 3.
FIG. 4.

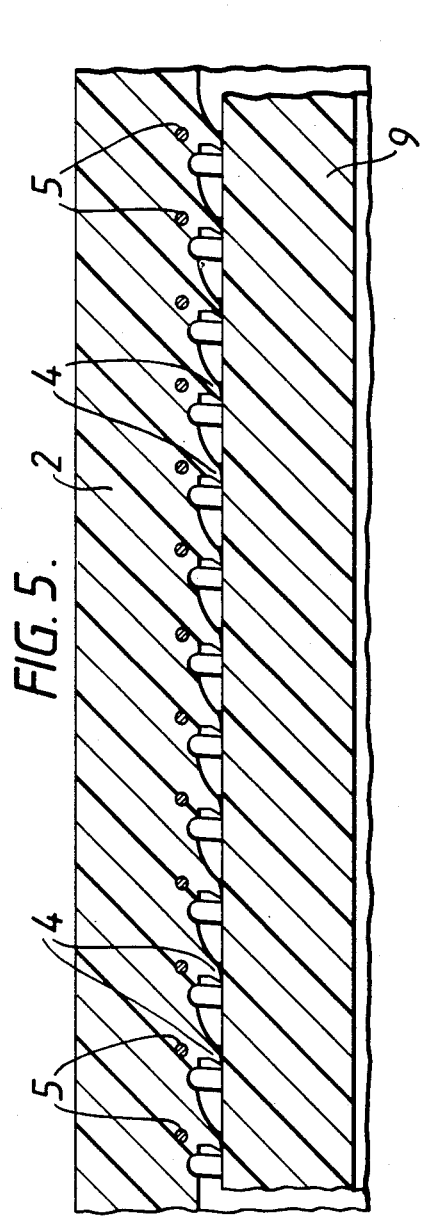
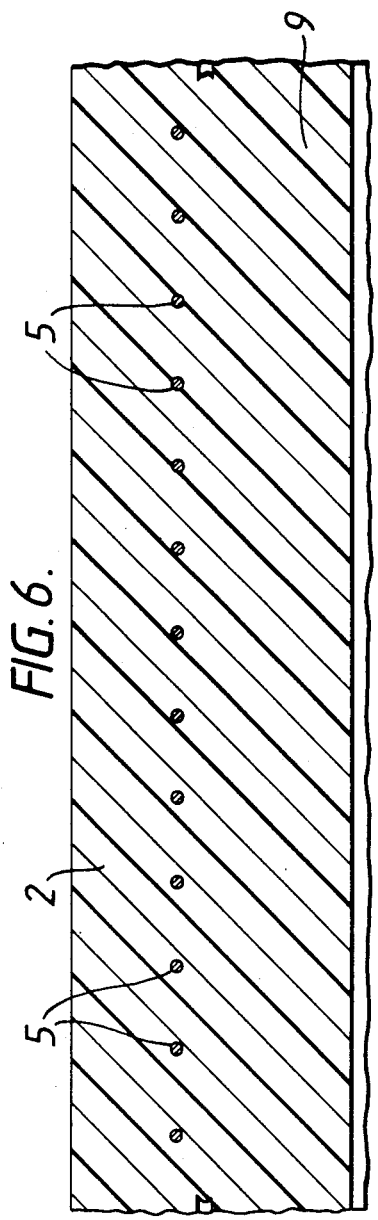

METHOD OF MAKING WELDED PIPE JOINTS

This invention relates to welded thermoplastic pipe joints by which is meant a connection between thermoplastic pipe or pipe like member and a pipe fitting including a sleeve overlying the end of the pipe or pipe like member and being fused or welded thereto.

More particularly the invention relates to the production of such welded joints which are adapted for welding or fusing by means of an electric heating wire embedded within the fitting or within the pipe or pipe like member.

It has already been proposed to provide a fitting having a hollow sleeve of the kind mentioned for encircling a pipe or pipe like member in which a helical groove is formed around the inner wall of the fitting or the outer wall of the ends of the pipes or pipe like members within which is located an electrically conducting wire, so that when in use the fitting is placed about the thermo-plastic pipe or pipe like member and electric current passed through the electric wiring, melting of the adjacent mating plastic surfaces of the sleeve and the pipe occurs and fusion or welding of the two bodies takes place. By means of such fittings a sealed connection can be made between two pipes or pipe like members in end to end disposition.

It is an object of the present invention to enable the formation of welded thermoplastic pipe joints with good thermal efficiency and with good location of the pipe within the sleeve.

According to the invention there is provided a method of forming a welded joint between an end of a thermoplastic pipe or pipe like member and a surrounding pipe fitting including a thermoplastic sleeve, comprising the steps of forming around the internal wall of the sleeve a helical cut, said cut being inclined to the surface of the wall along the line of cut, and the cutting tool and its angular relationship to the bore of the fitting being chosen such that during incision an internally extending flap of the thermoplastic material produced by the incision is caused to open out and deform transverse to the direction of incision whereby a helical cavity is formed within the sleeve wall; feeding into said cavity an electrically conducting wire; working the internal wall of the sleeve so as to lay, at least partially, the flap against that wall and enclose the wire within the cavity between the flap and the sleeve wall; fitting the sleeve about the end of the pipe or pipe like member; and passing an electrical current through the electrical wire so as to fuse the sleeve to the pipe or pipe like member.

We have found that during the welding or fusing operation the internally extending flaps, on initially heating the electrical wire, open out so as to extend into the bore of the sleeve. This causes them to abut against the outer surfaces of the pipe or pipe like member therein. This has the beneficial effect of increasing heat transfer from the electrical wires to the outer surface of the pipe or pipe like members, since in the circumstances of this form of welding, conduction is significantly more effective for transferring heat than convection or radiation between the sleeve and the pipe or pipe like members. In addition the inwardly extending flaps help to locate firmly, positively and centrally the pipe within the sleeve during the welding process.

It is believed that the internal opening out of the flaps is caused by a thermal memory effect in the thermoplastic material of the sleeve, in that they are tending to the disposition and configuration taken when the incisions were first cut in the sleeve. The deformation of the flaps at that first operation is believed to be caused by mechanical force.

A double ended sleeve may be provided for the connection of two pipes or pipe like members.

The helical incision may extend fully along the sleeve but may not be at the same pitch across the fitting. Thus, it may increase in angle over a portion between the two ends thereof so that a relatively close helical pitch is only obtained at each end of the sleeve at which the fitting is normally secured to pipes.

The electrical wire may be inserted manually within the cavity formed by the incision or may be inserted mechanically. Alternatively the wire may be fed into the cavity immediately upon its formation by means of suitable feed means incorporated within the cutting tool.

After completion of the formation of the incised helix and the insertion of the electrical wire, the wire may be anchored at each end, and the anchor points of the wire may be provided with electrical terminal caps. The flap incised from the helix may be "ironed" back into general conformity with the inner wall of the fitting and the electrical wire enclosed or encapsulated between the flap and the sleeve wall by the passage of a mandrel through the fitting. At the same time heat may be provided to assist the operation by briefly passing current through the electrical wire.

To ensure central registration of the pipe or pipes being joined by the fitting, physical shoulder stops may be incorporated into a central portion of the bore of the fitting.

It is to be understood that the method of formation of fitting herein above specified can be applied not only to joints utilising fitting or coupling having a single sleeve providing a straight through connection for pipes, but also to similar pipe like members and/or pipe fittings such as couplers, tees, 45° and 90° elbows, flange adapters and reducers, for example. In other words, the invention is applicable to different varieties of pipe fittings adapted to be fitted over pipes or pipe like members of various kinds.

The invention can, in an alternative arrangement, be applied by the incision of an inclined helical cut made around the outer periphery of a pipe or pipe like member prior to the insertion, in accordance with the invention, of an electrical wire within the incised cavity below the flap formed by means of the incision. In such an arrangement the sleeve of the pipe fitting will be placed over the pipe like member incorporating the encapsulated electrical wire and fused thereto, the flaps on the pipe or pipe like member acting in a similar manner to that described above in relation to flaps within the sleeve.

In order that the invention may be more readily understood one embodiment thereof will now be described by way of example with reference to the accompanying drawings in which:

FIGS. 3 to 6 are sections through the coupling of FIG. 1 and a pipe at different stages during the formation of a joint.

Figure 1:
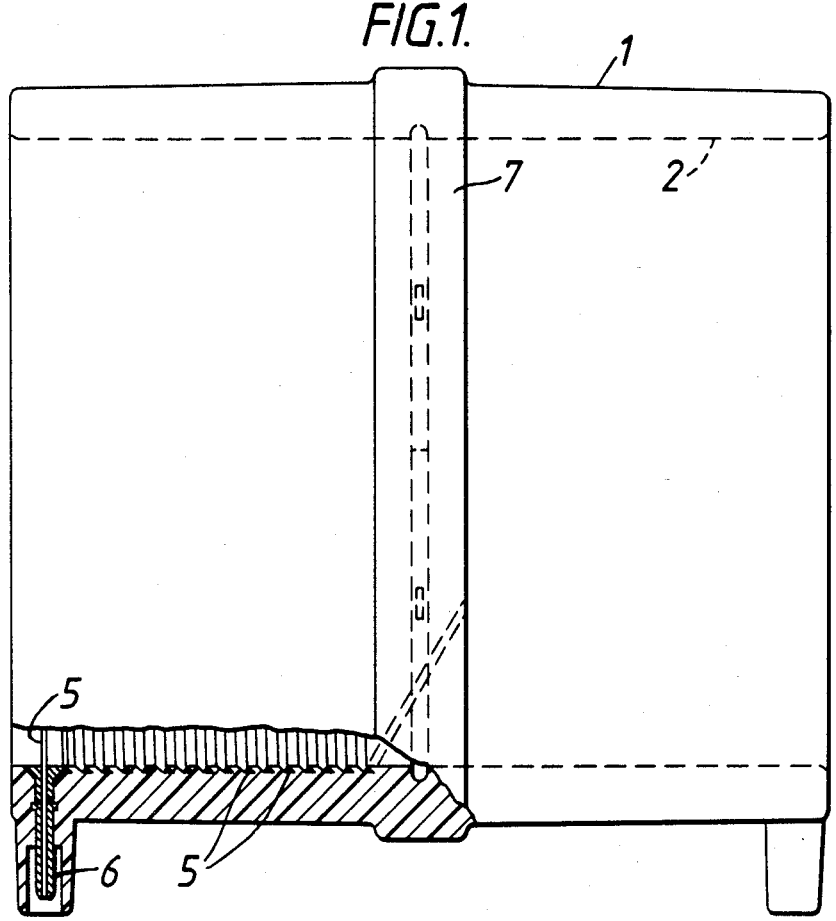
FIG. 1 is part sectional elevation of a pipe coupling for use in forming a joint according to the invention.
Figure 2:
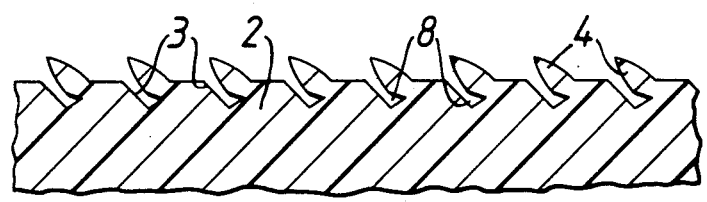
FIG. 2 is an enlarged section of part of the internal wall of the coupling of FIG. 1 during formation.

In FIG. 1 there is illustrated a pipe coupling 1 comprising a sleeve formed of thermoplastic material. Incised within the internal wall 2 of the coupling is a helical cut 3 (as seen in FIG. 2) formed at an inclined angle of approximately 30° to 60° to the plane of the bore at the point of incision. As can be seen the incision has been made such that the flap 4 partially cut free thereby, has been subjected to force and has expanded and opened out so as to define with the cut a cavity 8 beneath the internal wall of the fitting into which an electrically conducting wire 5 can be fed. Thereafter an internal mandrel is passed through the fitting to compress the internal wall back into desired dimensions whilst current is briefly passed through the wire 5 so that the flap is welded down onto the bore of the sleeve 1 thus encapsulating the wire.

As can be seen in FIG. 1 the wire 5 passes in helix from one end of the coupling to the other terminating in brass terminals 6 at each end. It is to be noted that whereas at each end the helix of the wire 5 is at a relatively close angled pitch, over the central band 7 of the coupling (within which there is no need for the pipes to be welded) the angle of pitch is substantially increased so that the wire traverses this band over a relatively short length.

FIG. 3 shows the wall 2 of the coupling immediately after the wire 5 has been inserted in the cavity 8. This figure, together with FIG. 2 clearly show the manner in which the flaps 4 open out naturally into the bore of the coupling.

FIG. 4 shows the wall 2 after a mandrel has passed through the coupling, whilst heating with current briefly passed through the wire 5, partially flattening the flaps 4 against the wall 2 and encapsulating the wire 5.

FIG. 5 illustrates the situation after a thermoplastic pipe 9, eg of polyethylene, has been fitted into the coupling, and shortly after the heating wire has been connected to a power supply. As can be seen, whilst some melting of the coupling adjacent the wire 5 has occurred, the most significant effect is that the flaps, we believe due to a plastic effect, have opened out and contact the pipe 9. This significantly assists transfer of heat to the pipe and also aids firm location and centralisation of the pipe within the coupling.

After heating for some time, fusion occurs between the pipe and the coupling, assisted by radial thermal expansion of the pipe, as shown in FIG. 6.

By means of the invention therefore we provide a method of forming a weld between thermoplastic pipes and a thermoplastic sleeve which is thermally efficient and additionally provides location during fusion of a firm and positive nature between the pipe and the sleeves.

I claim:

1. A method of forming a welded joint between an end of a thermoplastic pipe and a surrounding pipe fitting including a thermoplastic sleeve having a bore and an internal wall defining said bore, comprising the steps of forming around the internal wall of the sleeve a helical cut by means of a cutting tool, said cut being inclined to the surface of the wall along the line of cut, and the cutting tool and its angular relationship to the bore being chosen such that during incision an internally extending flap of the thermoplastic material produced by the incision is caused to open out and deform transverse to the direction of incision whereby a helical cavity is formed within the sleeve wall; feeding into said cavity an electrically conducting wire; working the internal wall of the sleeve so as to lay, at least partially, the flap against that wall and enclose the wire within the cavity between the flap and the sleeve wall; fitting the sleeve about the end of the pipe and passing an electrical current through the electrical wire so as to fuse the sleeve to the pipe.

2. A method as claimed in claim 1 wherein the pipe fitting includes a double ended thermoplastic sleeve for the connection of two pipes.

3. A method as claimed in claim 2 wherein the helical incision extends substantially fully along the sleeve and the pitch of the helical incision increases in angle over a mid-portion between the two ends of the sleeve.

4. A method as claimed in claim 1 wherein the electrical wire is inserted mechanically within the cavity formed in the incision.

5. A method as claimed in claim 1 wherein the electrical wire is fed into the cavity immediately upon its formation by feed means incorporated within the cutting tool.

6. A method as claimed in claim 1 wherein, after insertion of the conducting wire into the helical cavity, the wire is anchored at each end, and the anchor points are provided with electrical terminal caps.

7. A method as claimed in claim 1 wherein, after insertion of the conducting wire into the helical cavity, a mandrel is passed through the sleeve so as to lay the flap against the internal wall of the sleeve.

8. A method as claimed in claim 7 wherein electrical current is passed through the conducting wire as the mandrel is passed through the sleeve.

* * * * *